Figure 1:
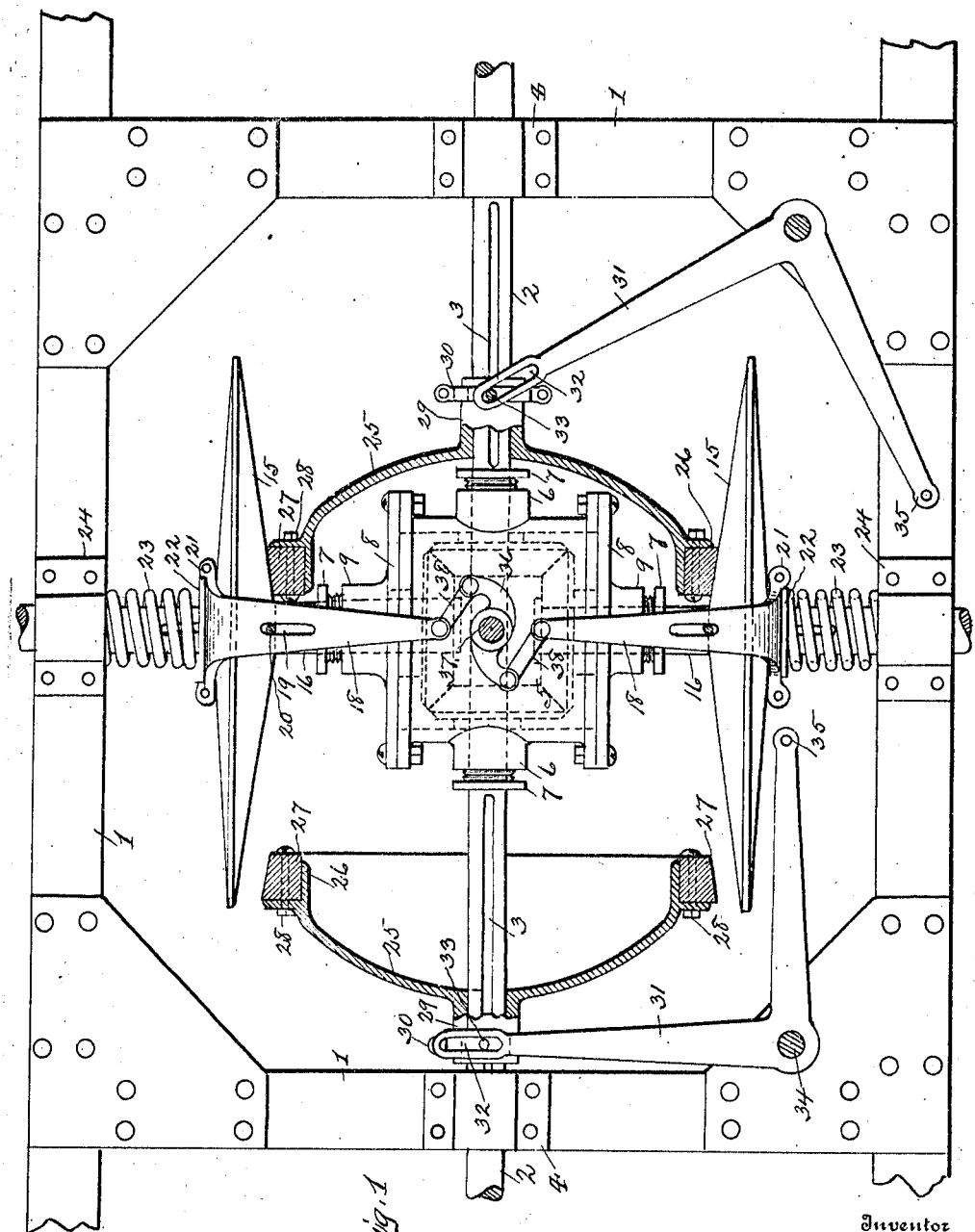

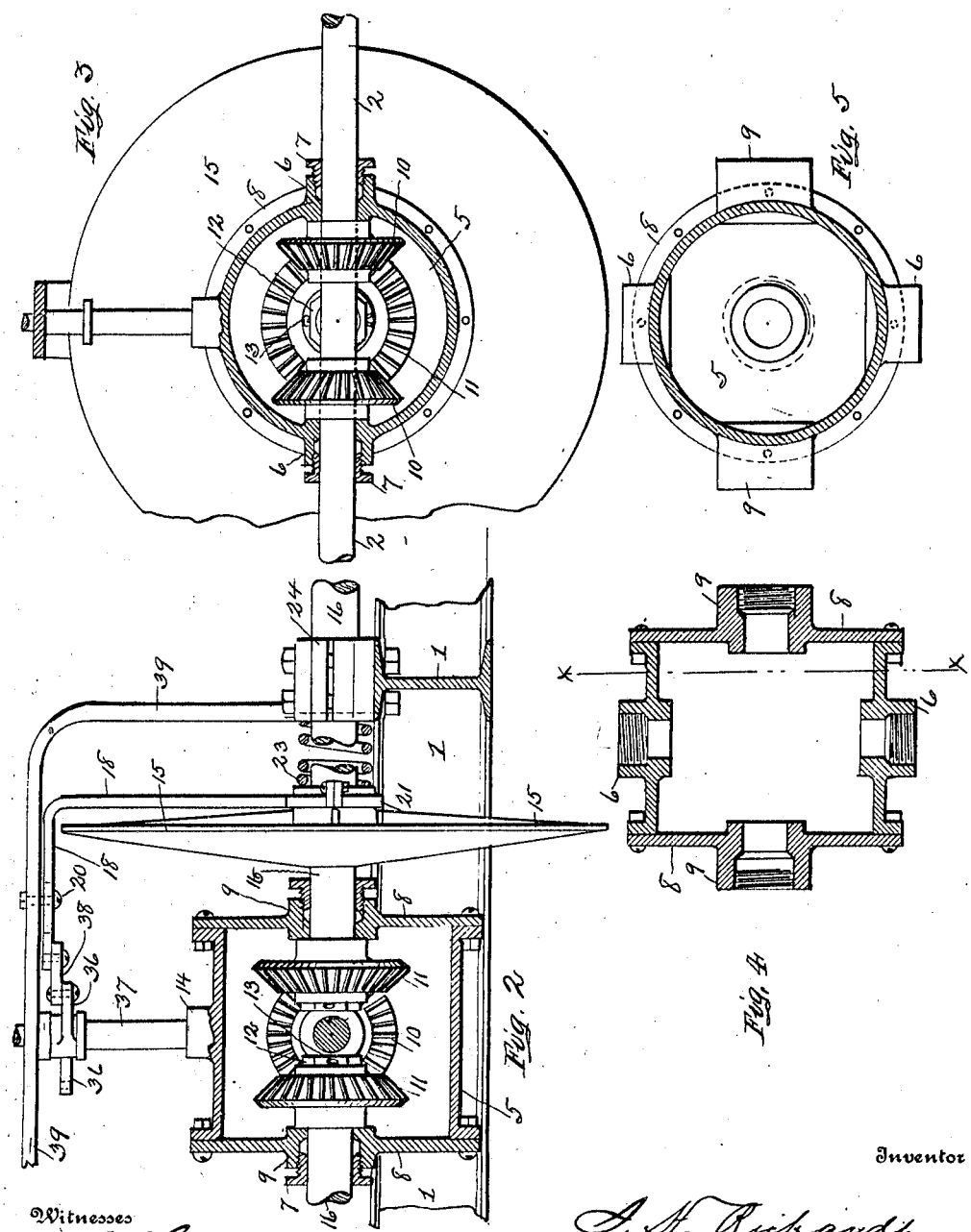

UNITED STATES PATENT OFFICE.

SIMEON H. RICKARD, OF PITTSBURG, PENNSYLVANIA.

POWER-TRANSMITTING MECHANISM.

970,753.   Specification of Letters Patent.   Patented Sept. 20, 1910.

Application filed May 1, 1909. Serial No. 493,274.

*To all whom it may concern:*

Be it known that I, SIMEON H. RICKARD, a citizen of the United States, residing at Pittsburg, in the county of Allegheny and State of Pennsylvania, have invented certain new and useful Improvements in Power-Transmitting Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention consists of an improvement in transmission gearing for power driven vehicles, as automobiles, or for other available purposes.

The object of the invention is to provide means whereby the power of an engine or any suitable motor or prime mover may be transmitted at variable speeds through friction mechanism to a utilizing shaft, as the axle of the vehicle.

The invention consists of a pair of companion shafts in axial alinement with each other; a transversely arranged intervening counter shaft; gearing whereby the motion of one of the companion shafts may be transmitted to the other; friction disks mounted on the companion shafts adjustable toward and from each other; friction wheels, and means for adjusting each of them toward and from the center of the companion shafts; and friction disks, making a frictional contact therewith at variable positions from the center of said disks, each revolving in opposite directions to rotate said friction wheel or wheels at speeds varying with the position of peripheral contact with the friction disks to actuate the counter shaft at correspondingly varying speeds.

The invention also includes an oil-tight casing or housing for the gearing mounted on said shafts by suitable bearings, and to other features of construction as shall be more fully hereinafter described.

In the drawings: Figure 1 is a plan view of the apparatus, partly in section, showing one of the friction wheels in driving engagement with the disks. Fig. 2 is a partial sectional end elevation of the mechanism, showing the gear casing in vertical section. Fig. 3 is a similar sectional view at right angles to Fig. 2, the gear casing being centrally divided vertically in line with the counter shaft. Fig. 4 is a horizontal sectional view of the gear casing detached. Fig. 5 is a cross sectional detailed view of the gearing on the line X—X of Fig. 4.

In Fig. 1 of the drawings the apparatus is shown as mounted for operation on the frame of an automobile, indicated by the numeral 1.

2 is a counter shaft extending longitudinally of the machine, provided with a spline or key way 3, said shaft being mounted in suitable bearings 4, 4, at each end of the middle working space, within which space the apparatus is mounted.

5 is a casing or housing for the gearing, hereafter described, cylindrical in form, having laterally extending bearings, with glands 7, 7, providing packed bearings embracing counter shaft 2 by means of which the casing is mounted on and supported by said shaft.

8, 8, are end portions of the casing bolted or otherwise secured thereon as shown, having endmost bearings 9, 9, and glands 7, 7, providing stuffing box bearings, embracing companion shafts 16, 16, (hereinafter described) in the same manner generally as bearings 6, 6.

Loosely mounted on counter shaft 2 within the casing 5 and bearing against the inner side of the bearings 6, 6, thereof by their hubs, are idler bevel gears 10, 10. Said gears intermesh with a driving and a driven bevel gear 11, 11, respectively, secured to the inner end of each shaft 16 by any suitable means, as a key or a threaded nut 12, and a locking cotter pin 13, whereby said wheels 11 are permanently secured to the inner ends of shafts 16.

14 is a boss or lug extending upwardly from the top of casing 5 and carrying shaft 37, hereinafter described.

Slidingly mounted on shafts 16, 16, are the power transmitting friction disks 15, 15, and engaging said shafts by spline or keyways, and having confronting friction faces in coni-form arrangement as shown, the purpose of said disks being to transmit the power from both of said shafts 16, through the friction wheel 25 to the counter shaft 2. It will be understood that one of the companion shafts 16 is actuated by any suitable prime mover or engine, and that it actuates the other companion shaft 16 through interposed gearing 10, 10, and 11, 11, at the same speed.

For the purpose of assisting in the performance of their functions and facilitating adjustment of friction wheel 25, it is desirable to maintain a normal inward pressure on disks 15, 15, for imparting frictional engagement of peripheral shoe 27 of wheel 25, for which purpose I employ springs 23, 23, interposed between bearings 24, 24, of shafts 16, 16, and extending inwardly against the hubs of friction disks 15, 15, as clearly shown in Figs. 1 and 2. Also for the purpose of adjusting said disks outwardly for clearance of the intervening friction wheel, I provide oppositely arranged yokes 18 having lower portions 21 embracing the grooved hub of each wheel 15 and secured to a corresponding semi-circular lower cap portion 22, whereby the hub of said wheel is engaged at each side by the yoke. The upper portions of yokes 18 are extended inwardly, having longitudinal slots 19 engaged by vertical pins or bolts 20 secured to a cross bracket or frame 39 extending upwardly from bearings 24, 24, at each side of the frame or mounted in any other suitable manner. By this means yokes 18 are maintained in alinement during their thrusting action. For the purpose of actuating the yokes 18, I provide the vertical rock shaft 37, stepped in bearing 14, and also journaled in a centrally arranged bearing in bracket 39. The inner terminals of yokes 18 are connected with the ends of a double arm S shaped crank 36 by links 38, said crank being secured upon shaft 37, which in turn is actuated by any suitable lever mechanism (not shown). By this means the friction disks 15 may be thrust apart to separate them for insertion of the friction wheel 25, and are normally pressed inwardly by springs 23. They may also be drawn together to any desired extent to increase the frictional engagement and augment the pressure of springs 23 within the control of the operator, as will be readily understood.

Each of the friction wheels 25, splined by its hub to counter shaft 2, as stated, is provided with an annular recess and reinforcing flange 26, carrying a friction ring 27 of fiber or other suitable friction material, secured by bolt 28 or otherwise, and having an annular beveled friction face corresponding in inclination to the face of disk 15. These friction wheels 25 and their rings operate to make frictional engagement with disks 15 at any desired position radially from their center and operate to transmit movement to the counter shaft 2 as stated. Hub 29 of each wheel is annularly grooved and provided with two-part rings 30, and for the purpose of shifting each wheel 25, I provide a bell crank or other form of lever 31, mounted on the frame 1, having a slotted terminal 32, engaging a stud 33 of ring 30, the other end 35 of the lever being connected with suitably arranged operating mechanism (not shown) whereby the friction wheel may be actuated.

As shown in the drawings, two friction wheels 25 are provided, mounted in the same manner, whereby either one may be thrown into or out of engagement with the friction disks to the desired degree, and it will be seen that with the use of one of such friction wheels the counter shaft 2 will be rotated in one direction, and by the other, in an opposite direction.

The operation of the invention is as follows: Power of the motor being applied to one of the companion driving shafts 16, and transmitted therefrom through the bevel gearing to the other companion shaft 16, and by these two the friction disks 15 rotate in opposite directions. Upon thrusting one or the other friction wheel 25 into engagement with said friction disks 15 at any desired point from the centers thereof, said disks being manipulated to locate their distance apart by springs 23 and yokes 18, driving movement is thereby transmitted to counter shaft 2 and the driving axle of the car. To decrease the speed of the car, disks 15 are separated sufficiently to permit friction wheels 25 to be inserted inwardly toward their centers, and to increase the speed the wheel 25 is withdrawn backwardly toward the peripheries of disks 15, the peripheral speed increasing with the distance from the center, and vice versa.

Any speed desired intermediate of the limits of movement may be secured and the changes in speed accomplished without the usual jar or sudden impact due to ordinary toothed transmission gearing. It will also be seen that the greatest power is accomplished in proportion with the slowest speed, and vice versa, intermediate speeds and powers maintaining relations to each other depending upon the position of friction wheel 25 from the center of disks 15.

In order to reverse the motion of the counter shaft 2 and driving axle it is only necessary to throw the active wheel 25 out of engagement and the other or inactive wheel into engagement with disks 15, care being taken to hold disks 15 separated in order to insert the said wheel to the desired position, and to avoid a sudden reversal of rotation or acceleration of shaft 2 in the opposite direction.

The inclosing of the bevel gearing within the oil-tight casing insures constant lubrication and easy operation so that starting of the car is accomplished without undue jar or vibration.

It will be understood that the invention may be variously changed or modified by the skilled mechanic, also that the usual operating foot or hand lever or other necessary parts may be supplied, and that the device may be applied to various uses to which it is applicable, or otherwise changed or varied, but all such changes are to be considered as within the scope of the following claims:

What I claim is—

1. In a power transmitting device, the combination of oppositely arranged separate shafts, toothed gearing connecting said shafts, friction driving disks in axial alinement and in driving engagement with said shafts, means for moving said disks axially therein, an intermediate friction wheel arranged to contact with said disks, and means for moving said wheel toward and from the center of said disks.

2. In a power transmitting device, the combination of oppositely arranged separate shafts, toothed gearing connecting said shafts, friction driving disks in axial alinement and in driving engagement with said shafts, means for moving said disks axially therein, a counter shaft extending transversely between said separated shafts, a friction wheel slidingly mounted on said counter shaft in driving engagement therewith, intermediate of said disks and arranged to contact therewith, and means for moving said wheel toward and from the center of said disks.

3. In a power transmitting device, the combination of oppositely arranged friction driving disks in axial alinement, means for moving said disks axially, a transversely arranged counter shaft, two friction wheels slidingly mounted on said shaft in driving engagement therewith located intermediate of and arranged to contact with said disks, and means for moving either of said wheels toward and from the center of said disks.

4. In a power transmitting device, the combination of a power driven shaft, a companion shaft in axial alinement therewith, a transverse counter shaft, bevel gears mounted on said shafts and adapted to transmit motion from the first named shaft directly to its companion shaft, oppositely arranged friction driving disks slidingly mounted on the power shaft and its companion shaft outside of said bevel gears, means for moving said disks on said shaft, an intermediate friction wheel slidingly mounted on said counter shaft in driving engagement therewith arranged to contact with said disks, and means for moving said wheel toward or from the center of said disks.

5. In a power transmitting device, the combination of a power driven shaft, a companion shaft in axial alinement therewith, a transverse counter shaft, bevel gears mounted on said shafts and adapted to transmit motion from the first named shaft to its companion shaft, oppositely arranged friction driving disks slidingly mounted on the power shaft and its companion shaft, means for moving said disks on said shaft, two friction wheels slidingly mounted on said counter shaft in driving engagement therewith arranged to contact with said disks, and means for moving either of said wheels toward and from said disks.

6. In a power transmitting device, the combination of two oppositely rotatable friction disks, separate shafts therefor in axial alinement with each other, a transversely arranged counter shaft, gearing mounted on all of said shafts arranged to transmit motion from the first named shaft directly to the second named shaft, friction wheels mounted on said counter shaft and in driving engagement therewith outwardly beyond said gearing and arranged intermediate of said disks, means for moving said friction disks in either direction, and means for moving said friction wheel toward or from the center of said disks.

7. In the apparatus described, the combination with the separated shafts and their connecting gearing and friction disks, a transversely arranged drive shaft, and intermeshing gearing; of an inclosing separable oil casing mounted on said shafts and inclosing the gearing.

8. In a power transmitting device, the combination of the sperarate drive shafts, the counter shaft, the friction disks and friction wheels, and the assembled transmitting toothed gearing, of a cylinder or casing loosely mounted upon the driving shafts and the counter shaft by laterally arranged bearings and having detachable heads, substantially as set forth.

9. In a power transmitting device, the combination with the separate drive shafts, the counter shaft, the assembled toothed gearing, and the friction disks and wheels and their adjusting mechanism, of an inclosing casing for the toothed gears having laterally projecting bearings and stuffing boxes on opposite sides, and separable heads each provided with a similar bearing, for mounting said casing upon said shafts to provide an oil-tight receptacle for the gearing, substantially as set forth.

In testimony whereof, I affix my signature, in presence of two witnesses.

SIMEON H. RICKARD.

Witnesses:
C. C. LEE,
O. A. HENSEL.